(12) United States Patent
Brown

(10) Patent No.: US 7,930,885 B2
(45) Date of Patent: Apr. 26, 2011

(54) WATER WAVE-BASED ENERGY TRANSFER SYSTEM

(76) Inventor: Clifford H. Brown, Kennewick, WA (US)

( * ) Notice: Subject to any disclaimer, the term of this patent is extended or adjusted under 35 U.S.C. 154(b) by 358 days.

(21) Appl. No.: 12/222,466

(22) Filed: Aug. 11, 2008

(65) Prior Publication Data
US 2009/0127860 A1    May 21, 2009

Related U.S. Application Data

(60) Provisional application No. 60/996,431, filed on Nov. 16, 2007.

(51) Int. Cl.
F03B 13/18 (2006.01)
F03B 17/02 (2006.01)

(52) U.S. Cl. .......... 60/504; 60/495; 60/497; 290/42; 290/53

(58) Field of Classification Search .......... 60/495–507; 290/42, 53
See application file for complete search history.

(56) References Cited

U.S. PATENT DOCUMENTS

| | | | | |
|---|---|---|---|---|
| 418,943 A | * | 1/1890 | Davy | 60/504 |
| 508,320 A | * | 11/1893 | Johansen | 60/504 |
| 997,663 A | | 7/1911 | Ford | |
| 1,292,223 A | | 1/1919 | Anell | |
| 1,318,469 A | * | 10/1919 | Wilkinson | 60/504 |
| 1,346,399 A | | 7/1920 | Crawford-Frost | |
| 3,297,300 A | * | 1/1967 | Mountanos | 60/504 |
| 4,208,877 A | | 6/1980 | Evans et al. | |
| 4,228,360 A | | 10/1980 | Navarro | |
| 4,241,579 A | | 12/1980 | Borgren | |
| 4,242,593 A | | 12/1980 | Quilico et al. | |
| 4,408,454 A | | 10/1983 | Hagen et al. | |
| 4,434,375 A | | 2/1984 | Taylor | |
| 5,359,229 A | | 10/1994 | Youngblood | |
| 5,424,582 A | | 6/1995 | Trepl, II et al. | |
| 5,808,368 A | * | 9/1998 | Brown | 290/53 |
| 6,956,299 B2 | | 10/2005 | Serrano Molina et al. | |
| 7,045,912 B2 | | 5/2006 | Leijon et al. | |
| 7,180,203 B2 | | 2/2007 | Mozafari | |

* cited by examiner

Primary Examiner — Thomas E Denion
Assistant Examiner — Christopher Jetton
(74) Attorney, Agent, or Firm — Richard C. Litman

(57) ABSTRACT

The water wave-based energy transfer system is a system for generating electrical power from the natural motion of water waves, such as ocean waves. The system includes an anchor adapted for stationary lodgment on an underwater support surface, such as the ocean floor, and at least one buoyant float provided for floating either on or below the ocean surface. At least one primary cable joins the at least one buoyant float to the anchor, and a secondary cable joins the at least one buoyant float to a tensioning device coupled with a power conversion and generation device on the shore. The oscillatory motion of the at least one buoyant float caused by the water waves or swells generates oscillatory motion in the second cable, which drives the power conversion and generation device.

12 Claims, 6 Drawing Sheets

US 7,930,885 B2

WATER WAVE-BASED ENERGY TRANSFER SYSTEM

CROSS-REFERENCE TO RELATED APPLICATION

This application claims the benefit of U.S. Provisional Patent Application Ser. No. 60/996,431, filed Nov. 16, 2007.

BACKGROUND OF THE INVENTION

1. Field of the Invention

The present invention relates to devices and systems for the transfer of mechanical forces derived from water waves to a location where they can be converted into, for example, electrical energy, or perform other useful work. More particularly, the invention is directed towards a water wave-based energy transfer system that converts the vertical motion of water waves into substantially horizontal motion, which can then be transferred a considerable distance and harnessed to provide useful work in a manner that minimizes construction costs and reduces the complexity of the elements exposed to water.

2. Description of the Related Art

Due to the limitations of non-renewable energy sources, such as oil and coal, as well as the negative environmental effects of such energy sources, it is desirable to provide alternative energy conversion and transfer systems that are based on renewable sources of power with minimal effects on the environment. In recent years, systems for the conversion of the energy of ocean-based waves into electrical power have been of interest. However, such systems typically require the construction of large and complex structures within the ocean. Not only are such structures difficult and costly to build, but their large-scale frameworks, built or deployed within the ocean, are vulnerable to storm damage and are costly to maintain.

It would be desirable to provide a system that allows for the transfer and conversion of usable energy from ocean waves, that does not require large scale construction, and that includes mechanical elements that are not vulnerable to high winds, storm currents and similar extreme environmental conditions. Thus, a water wave-based energy transfer system solving the aforementioned problems is desired.

SUMMARY OF THE INVENTION

The water wave-based energy transfer system is a system for generating useful work, such as electrical power, from the natural motion of water waves, such as ocean waves. Particularly, the transfer system converts or translates the vertical motion of water waves into largely horizontal motion, which can then be transferred toward the shore or other locations by a mechanism that is both relatively economical and resistant to storm damage. The system includes an anchor adapted for stationary lodgment on an underwater support surface, such as the ocean floor, and at least one buoyant float is provided for floating either on or below the ocean surface. At least one primary cable (or other elongated, flexible member) joins the at least one buoyant float to the anchor, and a secondary cable (or other elongated, flexible member) joins the at least one buoyant float to a tensioning mechanism located on the shore (for maintaining tension in the cable). The tensioning mechanism is, in turn, coupled with a mechanism for converting or transferring the oscillatory motion of the cable into useful work.

Tension is provided in the cable in such a way that the buoyant float follows an arcuate path, generating tension in the cable leading to a generator or other power transfer/conversion means. As waves pass under the float, it is pulled by buoyancy back along the arcuate path to a point more directly above the anchor, thus pulling the horizontal cable away from shore (and away from the generator).

As the wave trough passes under the float, the float will return to its original position under influence of the tensioning mechanism. The resulting reciprocating motion of the secondary cable is harnessed on shore for the production of useful work, which may include generation of electricity, pumping of water, filtering of sea water, etc.

A plurality of buoyant floats may be provided, with all of the floats preferably being joined to separate anchors. The plurality of floats are preferably staggered in a line towards the shore, as will be described below. The plurality of buoyant floats are joined to the tensioning mechanism by a single secondary cable. The oscillatory motion of the at least one buoyant float caused by the water waves generates oscillatory motion in the second cable, which, in turn, drives the power conversion mechanism coupled with the tensioning mechanism to create energy, such as electricity, for useful work. If the distance between the most distance float (measured from the shore) and the nearest float is less than the wavelength of incoming waves, multiple reciprocal horizontal motions can be produced during the passing of a single wave, thus multiplying the useful work possible on shore.

Alternatively, the water wave-based energy transfer system may include a second anchor adapted for stationary lodgment on the underwater support surface and a third anchor adapted for stationary lodgment on a ground-based or underwater support surface, such as the shore adjacent the ocean. A first elongated flexible member having opposed upper and lower ends is provided, with the lower end of the first elongated flexible member being joined to the second anchor. A pivotal rod having opposed upper and lower ends is further provided, with the lower end of the pivotal rod being pivotally joined to the third anchor.

At least one primary cable joins the at least one buoyant float, as described above, to the upper end of the flexible member attached to the underwater second anchor. A secondary cable joins the upper end of the flexible member to the upper end of the pivotal rod. A tertiary cable joins the upper end of the pivotal, land-based rod to the tensioning mechanism, so that oscillatory motion of the at least one buoyant float caused by water waves generates oscillatory motion in the secondary and tertiary cables, which drives the power transfer means coupled with the tensioning mechanism to create electrical energy. It should be noted that, in the above, the land-based rod and accompanying anchor may, alternatively, be positioned within the water.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
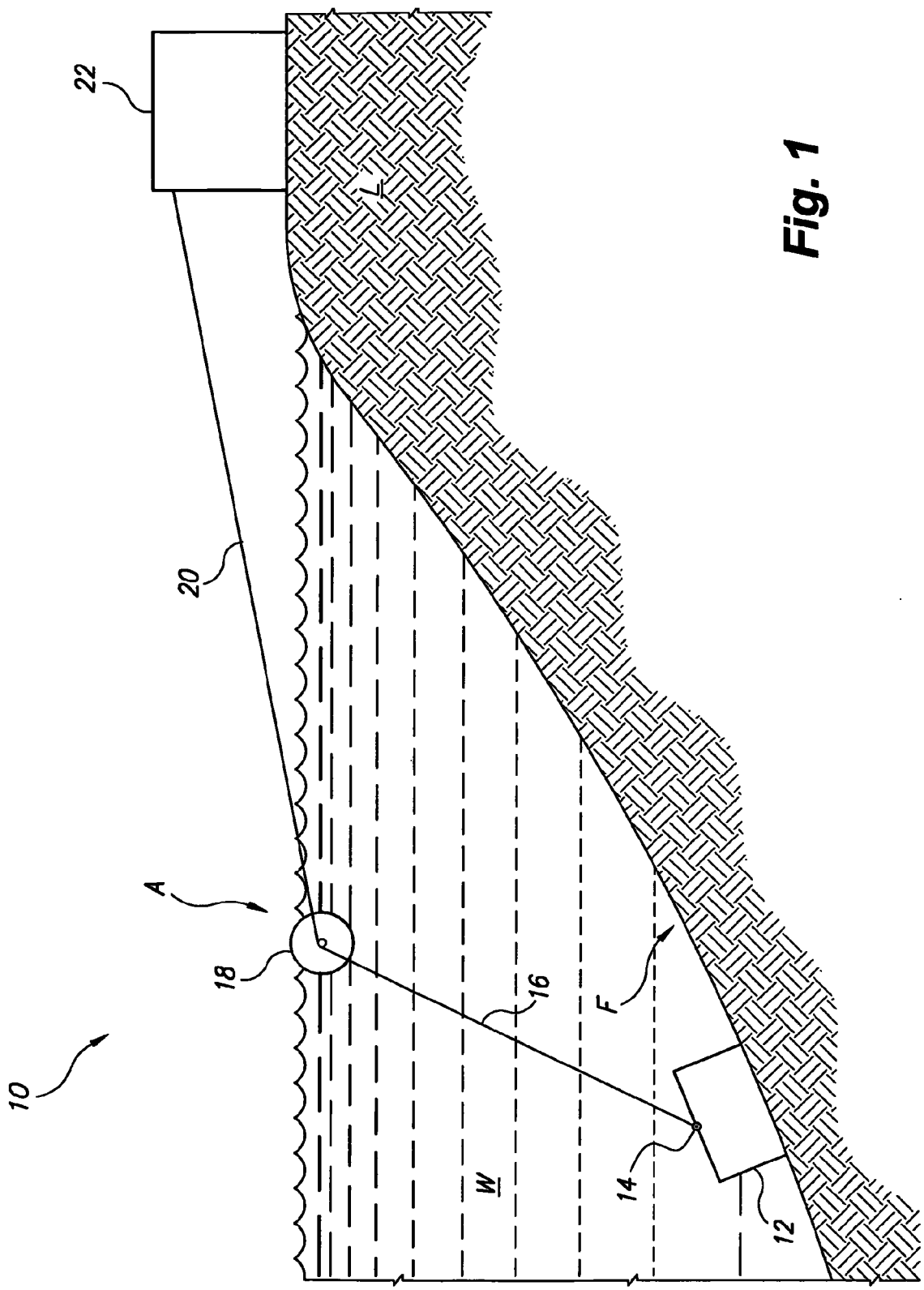
FIG. 1 is a diagrammatic side view of a water wave-based energy transfer system according to the present invention, shown in a first position.
Figure 2:
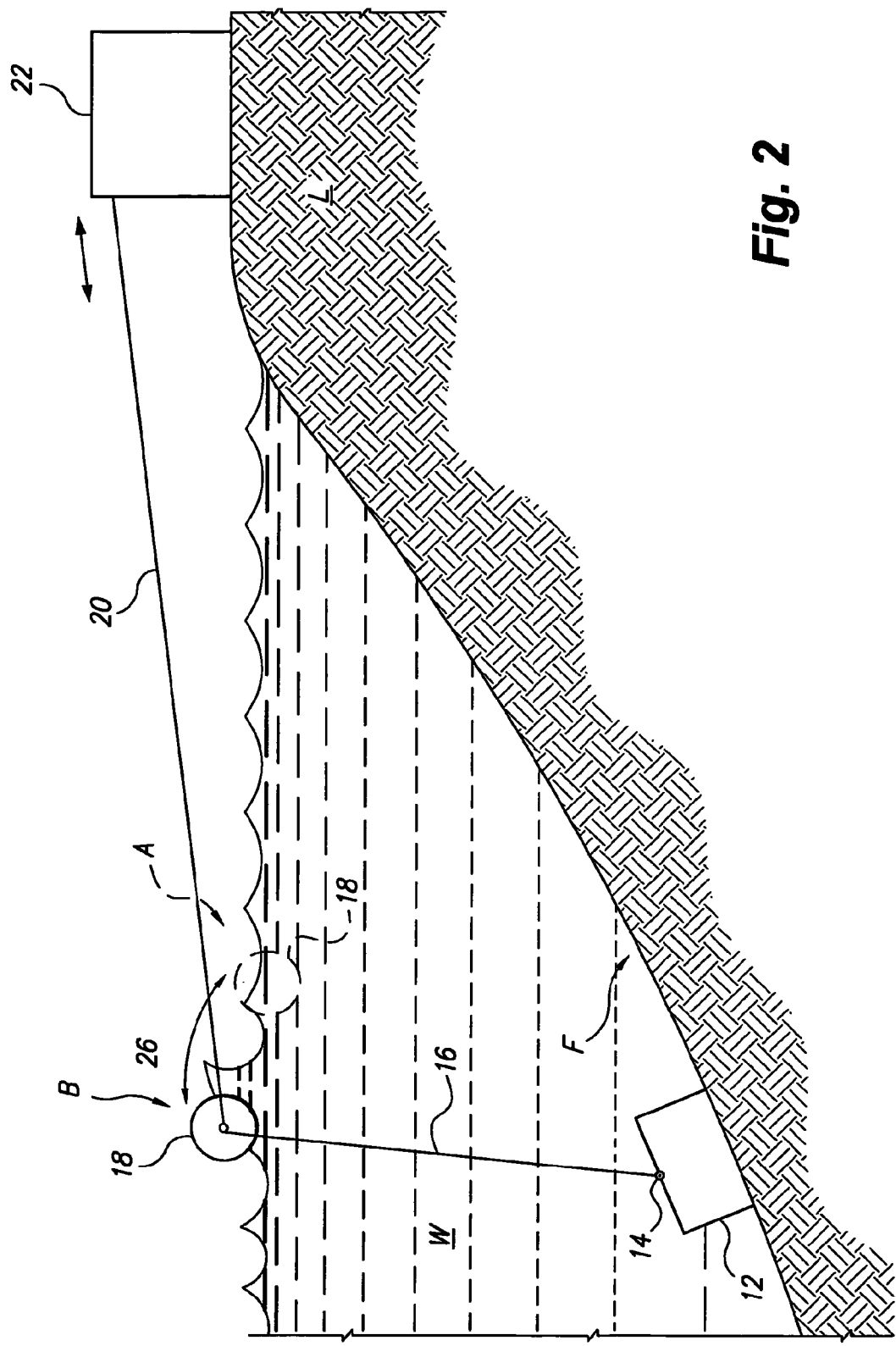
FIG. 2 is a diagrammatic side view of a water wave-based energy transfer system according to the present invention, shown in a second position.

The present invention is directed towards a water wave-based energy transfer system, designated generally as 10 in the drawings. As shown in FIGS. 1 and 2, the water wave-based energy transfer system 10 is a system for generating useful work from the natural motion of water waves, such as ocean waves. The system includes an anchor 12 adapted for stationary lodgment on an underwater support surface, such as the ocean floor F. At least one buoyant float 18 is provided for floating either on or below the ocean surface (shown in initial position A in FIG. 1). It should be understood that the system may be utilized with any body of water W and that the ocean and shore illustrated in the drawings is shown for exemplary purposes only.

At least one primary cable 16 joins the at least one buoyant float 18 to the upper end of anchor 12, and a secondary cable 20 joins the at least one buoyant float 18 to a tensioning mechanism 22 located on the shore (or other dry land mass) L. Although shown as having a single float 18 in FIGS. 1 and 2, the system 10 may have multiple floats, as will be described in greater detail below. In FIGS. 1 and 2, secondary cable 20 feeds into tensioning mechanism 22, which may be enclosed in a suitable housing.

The tensioning mechanism 22 may be any device that creates tension in secondary cable 20 and maintains cable 20 in a substantially horizontal orientation. The tensioning mechanism 22 may be a weight or weights secured to the end of the secondary cable 20; a pulley; a resilient member, such as a spring; or any other suitable means for creating tension in secondary cable 20.

The tensioning mechanism 22 is preferably joined to a mechanism for converting oscillatory motion into useful work. Such a conversion mechanism may be an electrical generator, for example, which is driven by the reciprocating and oscillatory motion of cable 20 for generating electricity. The conversion mechanism for converting oscillatory motion into useful work may be also be any suitable device, such as a water pump and/or desalination system. It should be understood that the generator, water pump, and desalination system are only representative examples of the mechanisms that may be driven by the system to convert energy directed by the system to tension mechanism 22 into other forms of energy, to store energy, or to perform useful work directly. A generator suitable for connection to the tensioning mechanism 22 is shown in U.S. Pat. No. 5,808,368, issued to the present inventor Sep. 15, 1998, which is hereby incorporated by reference in its entirety.

Referring back to FIGS. 1 and 2, primary cable 16 is joined to anchor 12 at 14 in any suitable manner. Anchor 12 may be any suitable mass that is not buoyant in water W, and is massive enough to remain fixed at a selected position on ocean floor F, despite currents and eddies in water W. Anchor 12 may have any suitable dimensions or configuration, and may be formed from any suitable non-buoyant material. Buoyant float 18 may be formed from any suitable buoyant material, such as a foam material, and may have any suitable size or configuration. Similarly, cables 16, 20 may be formed from any suitable non-corrosive material, which can withstand the mechanical stresses of oscillation (to be described below) and which is resistant to corrosion in an ocean-type environment.

In FIG. 1, the buoyant float 18 is shown in a first position A, resting on relatively calm water W (although the tensioning mechanism 22 is still generating a tensioning force in secondary cable 20, thus maintaining cable 20 in a substantially linear orientation). In FIG. 2, under the influence of an ocean wave 26, the buoyant float 18 rises with respect to the vertical (shown as position B). The float 18 also moves horizontally, with the total arcuate path being shown by the directional arrow in FIG. 2. Primary cable 16 has a fixed length, and anchor 12 maintains a fixed position, so cables 16 and 20 pivot with respect to anchor 12 (thus holding buoyant float 18 within a fixed horizontal region). As shown by the directional arrow in FIG. 2, the raising of float 18 causes oscillatory motion in secondary cable 20, which drives the generator or other power conversion means via tensioning mechanism 22 to produce electricity (or other useful work).

As wave 26 passes, float 18 will lower back to the position shown in FIG. 1, and the cables 16 and 20 will pivot in the opposite direction. In the preferred example, this oscillatory, reciprocating motion drives the exemplary generator (or other power generation or transfer systems) through tensioning mechanism 22 to produce useful work (in the form of electricity or the like), which may be transferred to a remote location via power cables or to an electrical storage device, such as a battery, as desired (in the particular example of electrical generation).

Figure 3:
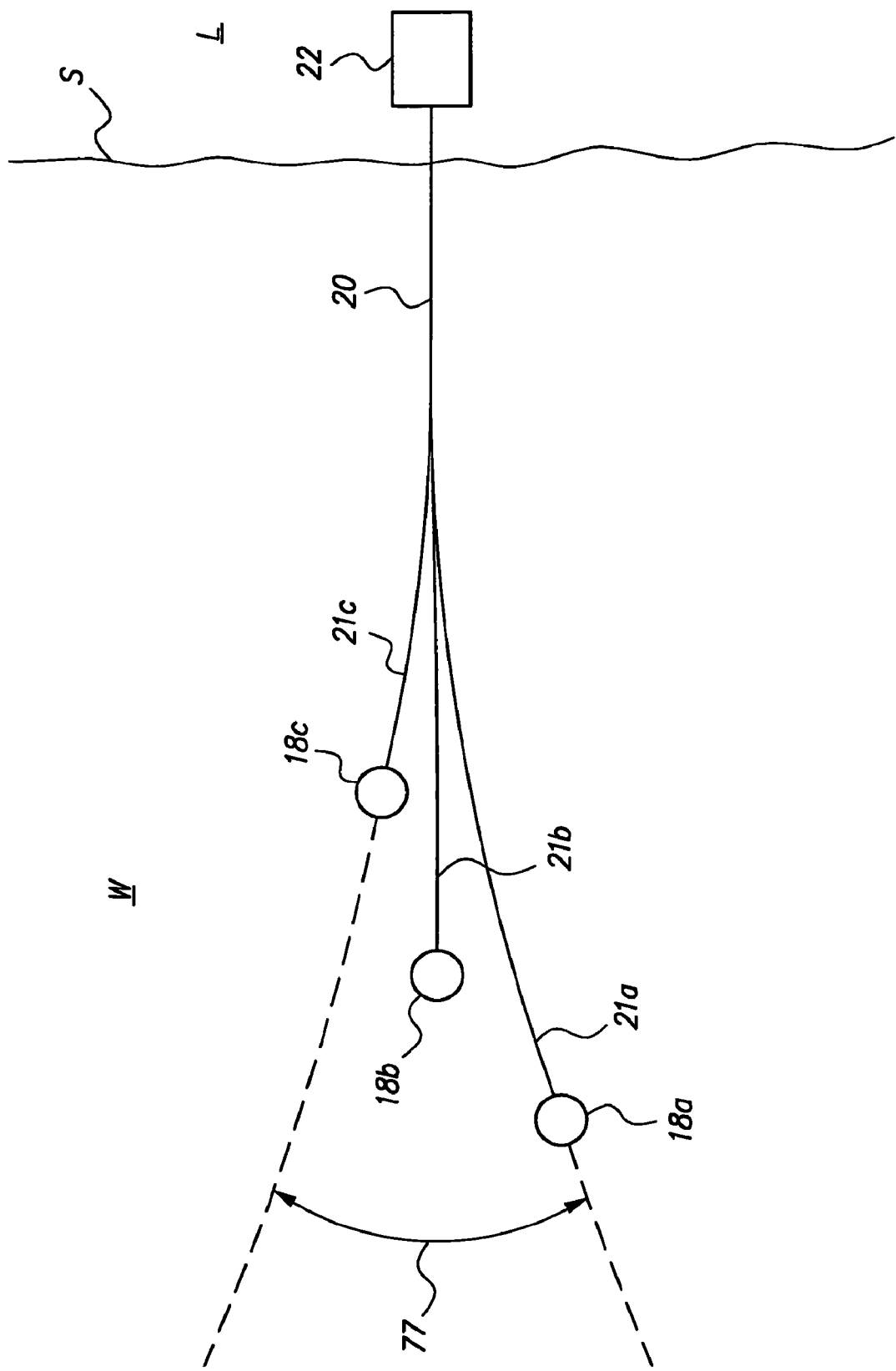
FIG. 3 is a diagrammatic, top plan view of a first alternative embodiment of the water wave-based energy transfer system according to the present invention.

In FIG. 1, a single buoyant float 18 is utilized. However the user may wish to increase the buoyant force on secondary cable 20 via usage of a plurality of buoyant floats 18a, 18b, 18c, as shown in FIG. 3. Although shown in FIG. 3 as having three buoyant floats, it should be understood that any desired number may be utilized, and that the three floats illustrated are shown for exemplary purposes only. Each of the floats 18a, 18b, and 18c is joined to the upper end of an anchor, similar to anchor 12, by a respective primary cable, as in the embodiment of FIGS. 1 and 2.

The plurality of buoyant floats 18a, 18b, and 18c are preferably joined to tensioning mechanism 22 by a single secondary cable 20, as in the previous embodiment, although each buoyant float is preferably joined to a separate cable 21a, 21b, 21c, as shown, which are, in turn, each joined at a single point to secondary cable 20. Similar to the embodiment of FIGS. 1 and 2, the oscillatory motion of the plurality of floats 18a, 18b, 18c under the influence of waves 26 in water W generates oscillatory motion in the second cable 20, which, in turn, drives the tensioning mechanism 22 to create electrical energy or perform other useful work.

In FIG. 3, the floats 18a, 18b, 18c are shown as covering an angular span 77, and are shown as being spaced at different distances from secondary cable 20. It should be understood that the floats 18a, 18b, 18c may be arranged in any suitable position. As an alternative, in addition to being coupled with the tensioning mechanism 22, and driving a generator or the like, a filtration device may be further powered by the oscillatory motion caused by the floats 18a, 18b, 18c, with the filtration device producing fresh, desalinated water for drinking. It should be understood that angular span 77 is shown for exemplary purposes only, and that span 77 is exaggerated for purposes of illustration only. Preferably, the multiple floats are arranged with a horizontal deviation smaller than the wavelength of the ocean waves. Span 77 is also preferably significantly less than the angle of the arcuate path illustrated in FIG. 2 (between positions A and B), otherwise lateral horizontal motion will be induced in cable 20, rather than the preferred substantially longitudinal oscillatory motion indicated by the dual-headed arrow in FIG. 2. Further, each float 18a, 18b, 18c is preferably fixed to its own anchor, as will be described below with regard to FIG. 5.

Figure 4:
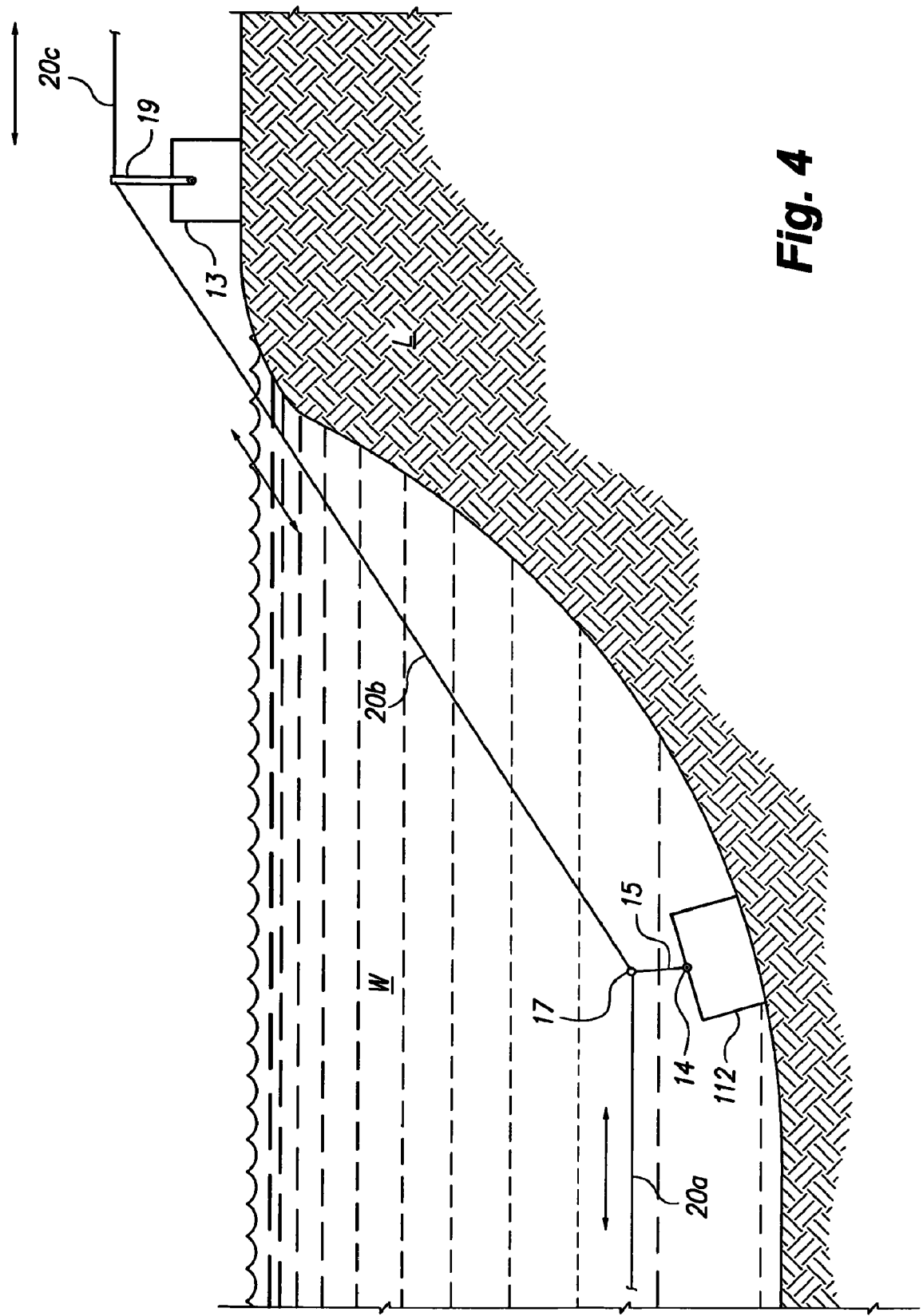
FIG. 4 is a diagrammatic side view of a second alternative embodiment of the water wave-based energy transfer system according to the present invention.

In the embodiment of FIG. 4, as a further alternative, the water wave-based energy transfer system may include both a first anchor 112 adapted for stationary lodgment on the underwater support surface F and a second anchor 13 adapted for stationary lodgment on a ground-based support surface L, such as a location on the shore adjacent the ocean. Second anchor 13 may, alternatively, be positioned underwater. It should be noted that anchor 112 functions to pivot cable 20 in an upward direction, rather than having a float directly attached thereto (as in the embodiment of FIGS. 1 and 2). A first cable 15 or other elongated flexible member having opposed upper and lower ends is provided, with the lower end of the first cable 15 being joined to the first anchor 112 at 14. A pivoting rod 19 having opposed upper and lower ends is further provided, with the lower end of the pivoting rod 19 being pivotally joined to the second anchor 13.

At least one primary cable 20a joins at least one buoyant float (not shown in FIG. 4, but similar to floats 18a, 18b, and 18c in FIG. 5), which may be positioned underwater to the left side of the Figure, as described above, to the upper end of the first cable 15. Cable 15 is joined to cables 20a and 20b at 17 in any suitable manner. As shown in FIG. 4, in this embodiment, the primary cable 20a is primarily positioned underwater, and extends outwardly for fixture to at least one float (as described above). Secondary cable 20b joins the upper end of the first cable 15 to the upper end of the pivoting rod 19. A tertiary cable 20c joins the upper end of the land-based rod 19 to the tensioning mechanism 22 (not shown in FIG. 4) so that oscillatory motion of the buoyant floats caused by surface waves or swells within body of water W generates oscillatory motion in the secondary and tertiary cables 20b, 20c, which drives the energy transfer or conversion mechanism coupled to the tensioning mechanism to perform useful work. It should be understood that the land-based anchor and accompanying rod are shown for exemplary purposes only and that the rod and anchor may, alternatively, be positioned within the water.

Figure 5:
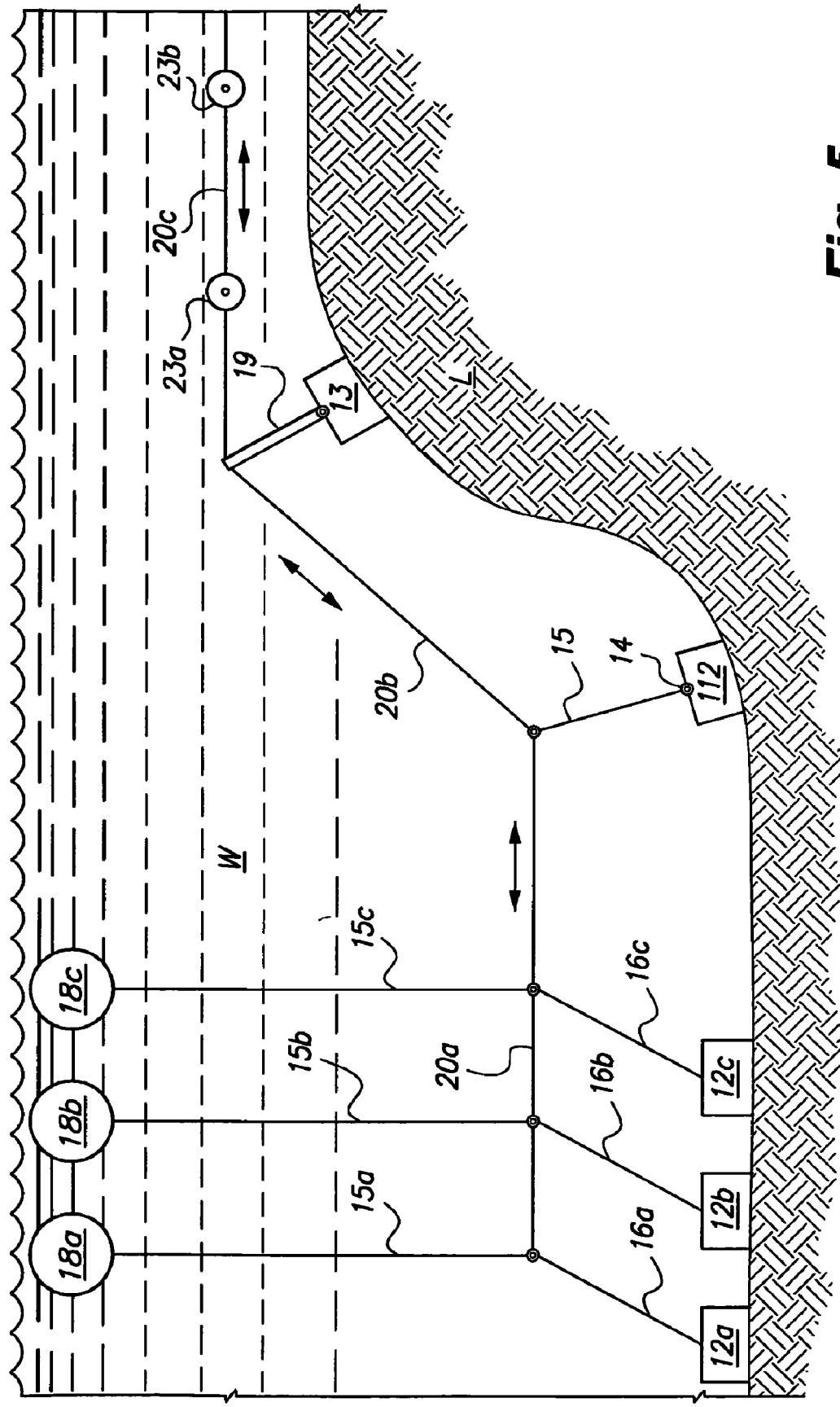
FIG. 5 is a diagrammatic side view of a third alternative embodiment of the water wave-based energy transfer system according to the present invention.

As a further alternative, as shown in FIG. 5, multiple floats 18a, 18b, 18c may be provided, as described above, with each float being anchored by a separate anchor 12a, 12b, 12c, as shown. Each anchor 12a, 12b, and 12c is tethered to primary cable 20a by a separate lower elongated flexible member or cable 16a, 16b, 16c, respectively, and each float is tethered to primary cable 20a by a separate elongated flexible member or cable 15a, 15b, 15c, as shown. Motion of the floats 18a, 18b, 18c causes oscillatory motion in primary cable 20a (as indicated by the directional arrow), which is translated to secondary cable 20b. As shown, this embodiment is utilized for underwater contours having a steep drop-off.

Anchor 112 is positioned near the lower end of the drop-off, and is tethered joined to primary cable 20a and secondary cable 20b by cable 15, which is, in turn, joined to the upper end of anchor 12 at 14. Secondary cable 20b is positioned so that cable 20b is angled upward, approximately following the grade of the underwater landscape, and is joined to the upper end of pivoting rod 19, which is joined to anchor 13 (similar to the out-of-water embodiment of FIG. 4). The oscillatory motion is translated to cable 20c, which may have further auxiliary floats 23a, 23b affixed thereto. Auxiliary floats 23a, 23b are positioned on cable 20c in order maintain cable 20c in an approximately horizontal orientation and maintain tension on the cable 20c to prevent the cable 20c from sagging. The auxiliary floats 23a, 23b do not replace the tensioning means, but aid in the function of the tensioning means (described above). Auxiliary floats 23a, 23b remove the necessity for conventional, expensive underwater structures. The usage of the auxiliary floats allows for the cable to be elongated and stretch for relatively large distances without the cable sagging under the force of its own weight. Similar floats may also be deployed along cable 20a for the same purpose.

It will be understood that, as used herein, the term elongated flexible member refers to a cable, rope, chain, tether, cord, wire, or other flexible line, which is preferably resistant to corrosion or other deterioration from submergence in either fresh water or salt water, and having sufficient strength to withstand tension applied by the tensioning mechanism 22 and movement of waves. Further, although described above as having a particular underwater connecting structure, it should be understood that the underwater cables and associated anchors may have any desired structure and arrangement, such as, for example, that shown in the aforementioned U.S. Pat. No. 5,808,368.

Figure 6:
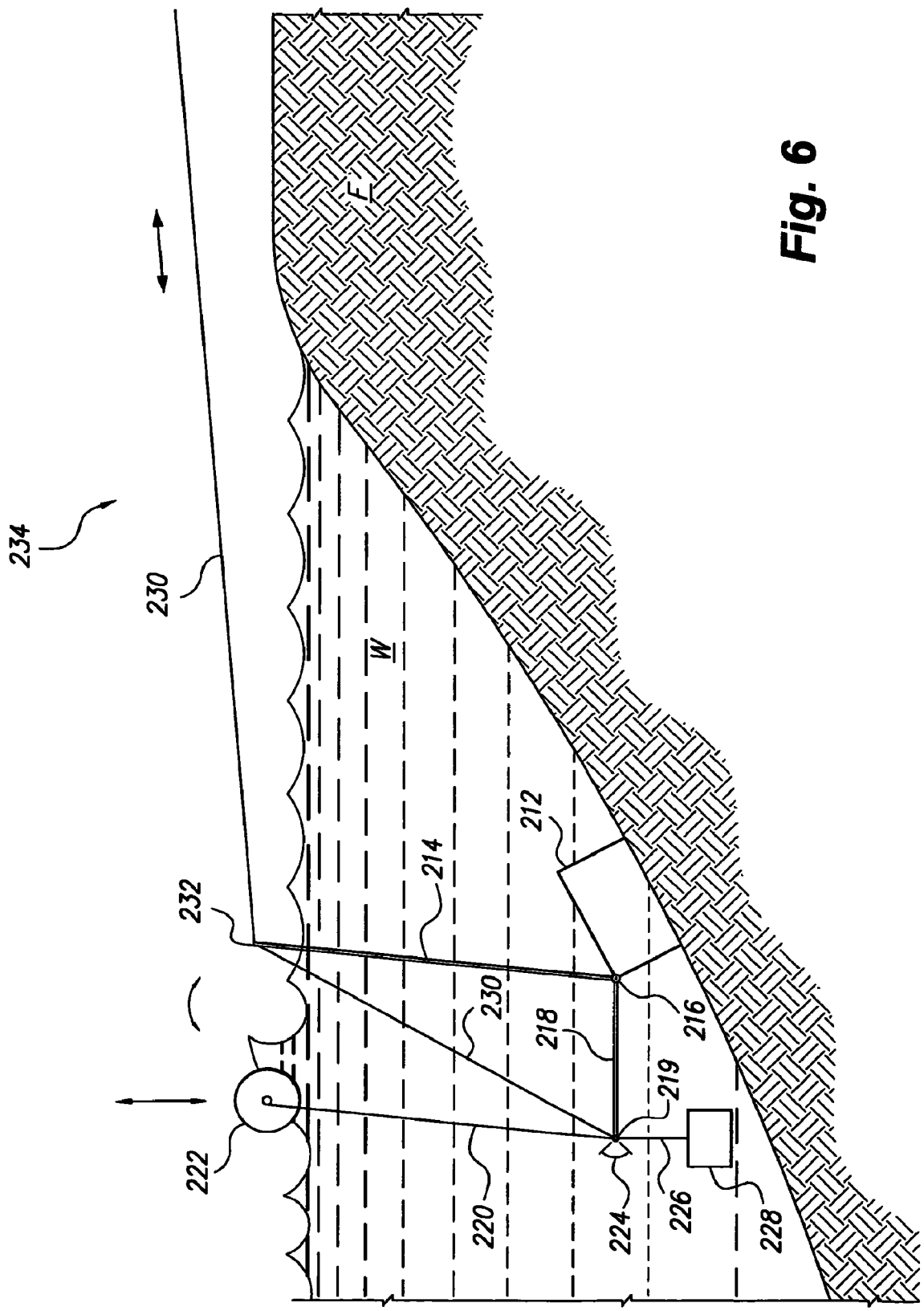
FIG. 6 is a diagrammatic side view of a fourth alternative embodiment of the water wave-based energy transfer system according to the present invention.

In the alternative embodiment of FIG. 6, anchor 212, which may be similar in construction to anchor 12 of FIG. 1, is mounted on the ocean floor F. A pair of rigid rods 214, 218 (which may be similar in construction to rods 19 of FIGS. 4 and 5) are pivotally mounted to the anchor 212 about a pivot 216, as shown. Rigid rods 214, 218 are preferably maintained at a constant angle with respect to one another, with rod 214 pointing in a substantially vertical direction and rod 218 extending along a substantially horizontal direction. A counterweight 228, which may be any suitable waterproof weight, is hung by cable 226 from the opposite end 219 of rigid rod 218. Further, a float 222, similar to float 18 of FIG. 1, is joined to end 219 of rod 218 by a cable 220, as shown. It should be understood that cable 226 is shown for exemplary purposes only, and that counterweight 228 may be connected to rod 218 through any suitable connection, including, but not limited to, direct attachment of the counterweight to end 219 of rod 218.

A length of cable 230 is joined at one end thereof to end 219 of rod 218 and is supported along a central portion thereof by upper end 232 of rod 214. Cable 230 extends towards land to be secured to a tensioning device, similar to device 22 of FIG. 1, and connection to a power generator or other mechanical system. In use, float 222 moves under the power of waves in water W, thus causing rod 218 to pivot about pivot point 216, as shown by the directional arrows in FIG. 6. This rotational motion is translated to rigid rod 214, which also pivots about pivot point 216. Cable 230 is secured to end 219 of rod 218 and is supported by upper end 232 of rod 214 and, as a consequence of the angular motion of the rods 214, 218, the portion of the cable that reaches the land (indicated generally as 234) is driven into a substantially horizontal, oscillatory motion.

It should be noted that, in FIG. 6, rods 214 and 218 are shown having exemplary lengths and that rod 214 does not need to have a greater length than rod 218, as shown. Further, the positioning of the system in FIG. 6 is shown for exemplary purposes only. For example, the entire system may be positioned underwater, such that the top end 232 of rod 214 is submerged, as opposed to the top end 232 projecting out of the water, as shown. It should be noted that if the length of the horizontal rod 218 is of sufficient length, the arc through which the top end 232 of rod 214 moves will be approximately horizontal, regardless of the height of the tide.

It should be further noted that float 222 does not move in a horizontal direction with the passage of each wave, since the float (as opposed to the floats of previous embodiments) is not pulled towards the shore by a tensioning device. Float 222 is pulled in the downward direction by cable 220 alone. As described above with regard to the previous embodiments, float 222 may further be positioned beneath the water's surface; i.e., it is not required to float on the water in order to generate the arcuate, oscillatory motion of top end 232 of rod 214. The advantage of the system of FIG. 6 lies in the rotation of rods 214, 218, wherein a smaller float 222 (in comparison to the float of FIG. 1) may be utilized to create an equivalent oscillatory motion on cable 230. It should be understood that the arrangement of the system of FIG. 6 may be used in combination with previous embodiments, such as those shown in FIGS. 3, 4 and 5.

It is to be understood that the present invention is not limited to the embodiments described above, but encompasses any and all embodiments within the scope of the following claims.

I claim:

1. A water wave-based energy transfer system, comprising:
   at least one anchor adapted for stationary lodgment on an underwater support surface;
   at least one buoyant float;
   a primary cable securing the at least one buoyant float to the at least one anchor;
   at least one secondary cable secured to the at least one buoyant float;
   means for applying tension to the at least one secondary cable, the means for applying tension being adapted for coupling to an energy conversion mechanism; and
   further comprising first and second rigid rods, each of the rods having opposed first and second ends, the first ends being pivotally secured to the at least one anchor, said primary cable being secured to, and extending between, said at least one buoyant float and the second end of the first rigid rod,
   wherein oscillatory motion of the at least one buoyant float resulting from waves in the water generates oscillatory motion in the at least one secondary cable, the oscillatory motion in the second cable being coupled through the tension applying means to the energy conversion mechanism for conversion for useful work.

2. The water wave-based energy transfer system as recited in claim 1, wherein said at least one buoyant float comprises a plurality of buoyant floats and said at least one secondary cable comprises a plurality of secondary cables, said water wave-based energy transfer system further comprising a plurality of primary cables, each said primary cable joining a respective one of said buoyant floats to the at least one anchor, each said secondary cable being joined to a respective one of said buoyant floats.

3. The water wave-based energy transfer system as recited in claim 2, wherein said at least one anchor comprises a plurality of anchors, each said primary cable joining a respective one of said buoyant floats to a respective one of said anchors.

4. The water wave-based energy transfer system as recited in claim 1, wherein said at least one secondary cable is secured at one end thereof to the second end of the first rigid rod.

5. The water wave-based energy transfer system as recited in claim 4, wherein a central portion of said at least one secondary cable is supported by the second end of the second rigid rod.

6. The water wave-based energy transfer system as recited in claim 5, wherein said first and second rigid rods form a constant angle.

7. The water wave-based energy transfer system as recited in claim 5, further comprising a counterweight suspended from the second end of the first rigid rod.

8. The water wave-based energy transfer system as recited in claim 1, further comprising at least one auxiliary buoyant float secured to said at least one secondary cable, whereby said at least one auxiliary buoyant float prevents sagging of said at least one secondary cable.

9. A water wave-based energy transfer system, comprising:
   a plurality of anchors adapted for stationary lodgment on an underwater support surface;
   a plurality of buoyant floats;
   a plurality of primary cables, each of the primary cables joining one of the buoyant floats to a respective one of the plurality of anchors;
   a secondary cable attached to a central portion of each of the primary cables;
   a secondary anchor adapted for stationary lodgment on the underwater support surface;
   a tertiary cable secured to, and extending between, the secondary anchor and a central portion of said secondary cable; and
   means for applying tension to the secondary and tertiary cables, the means for applying tension being adapted for coupling to an energy conversion mechanism;
   wherein oscillatory motion of the at least one buoyant float resulting from waves in the water generates oscillatory motion in the secondary cable, the oscillatory motion in the second cable being coupled through the tertiary cable and the tension applying means to the energy conversion mechanism for conversion for useful work.

10. The water wave-based energy transfer system as recited in claim 9, further comprising:
   a tertiary anchor adapted for stationary lodgment on the underwater support surface; and
   a rigid rod having opposed first and second ends, the first end thereof being pivotally secured to the tertiary anchor, the second end thereof supporting the central portion of said secondary cable.

11. The water wave-based energy transfer system as recited in claim 10, further comprising at least one secondary buoyant float secured to the central portion of said secondary cable.

12. A water wave-based energy transfer system, comprising:
   a first anchor adapted for stationary lodgment on an underwater support surface;
   a second anchor adapted for stationary lodgment on a ground-based support surface;
   a first elongated flexible member having opposed upper and lower ends, the lower end of the flexible member being tethered to the first anchor;
   a pivotal rod having opposed upper and lower ends, the lower end of the pivotal rod being pivotally joined to the second anchor;
   at least one buoyant float;
   a primary cable joining the at least one buoyant float to the upper end of the first elongated flexible member;
   a secondary cable joining the upper end of the first elongated flexible member to the upper end of the pivotal rod;
   means for applying tension to the secondary cable; and
   a tertiary cable adapted for coupling the upper end of the pivotal rod to an energy conversion mechanism;
   wherein oscillatory motion of the at least one buoyant float caused by waves in the water generates oscillatory motion in the secondary and the tertiary cables adapted for coupling to the energy conversion mechanism for conversion to useful work.

\* \* \* \* \*